United States Patent [19]

King, Jr.

[11] 4,405,256

[45] Sep. 20, 1983

[54] CUSHIONED FASTENER JOINT

[76] Inventor: John O. King, Jr., 3990 N. Ivy Rd., Atlanta, Ga. 30342

[21] Appl. No.: 254,324

[22] Filed: Apr. 14, 1981

[51] Int. Cl.³ .............................................. F16B 19/00
[52] U.S. Cl. ...................................... 403/408; 29/523; 29/526 R; 29/507; 411/360; 411/69; 403/228; 403/224
[58] Field of Search ............... 403/408, 405, 228, 224, 403/225, 226, 57, 338; 411/501, 500, 360, 362, 69, 70; 29/507

[56] References Cited

U.S. PATENT DOCUMENTS

| | | | |
|---|---|---|---|
| 2,501,567 | 3/1950 | Huck | 411/70 |
| 2,728,593 | 12/1955 | Hutton | 403/224 |
| 2,740,650 | 4/1956 | Hutton | 403/224 |
| 2,767,877 | 10/1956 | Newsom | 411/501 X |
| 2,777,620 | 12/1956 | Thiry et al. | 403/224 X |
| 3,835,615 | 9/1974 | King | 403/2 X |
| 3,835,688 | 9/1974 | King | 72/391 X |
| 3,875,649 | 4/1975 | King | 411/69 X |
| 3,949,535 | 4/1976 | King | 403/388 |
| 4,102,030 | 7/1978 | King | 403/408 X |

Primary Examiner—Andrew V. Kundrat
Assistant Examiner—Joseph A. Fischetti
Attorney, Agent, or Firm—B. J. Powell

[57] ABSTRACT

A method of forming a fastener joint in a composite material work piece subject to an operating load comprising the steps of forming a hole of a prescribed hole diameter through the composite material work piece placing a tubular metal sleeve member with a compressible cushion layer around the outside thereof within the hole through the work piece; non-elastically expanding the tubular metal sleeve member radially and circumferentially to force the cushion layer into contact with the hole surface and compress the cushion layer; and placing a fastener in the tubular metal sleeve member to maintain the sleeve member radially and circumferentially expanded and the cushion layer compressed to a thickness to transmit the operating load from the work piece to the fastener through the cushion layer and sleeve member. The joint formed by the method is also disclosed.

9 Claims, 10 Drawing Figures

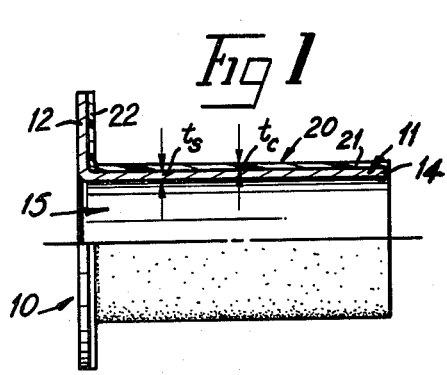
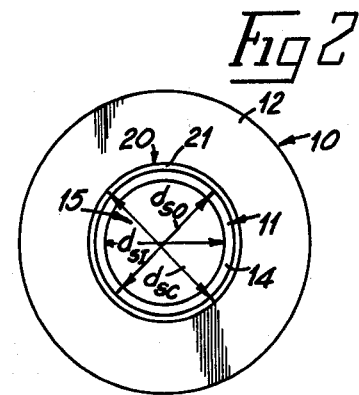
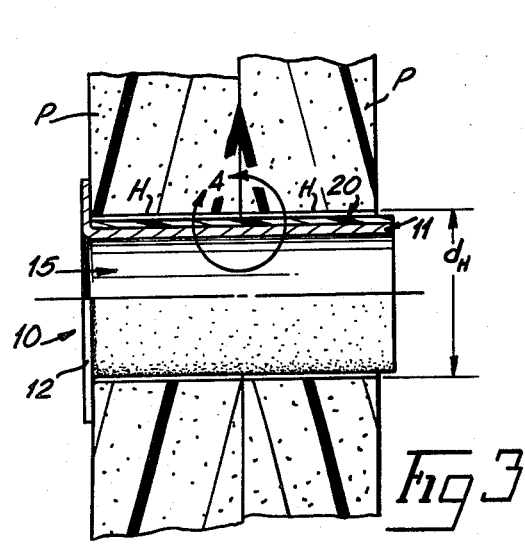
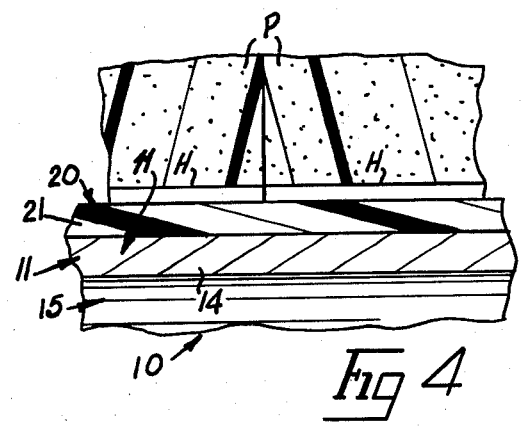
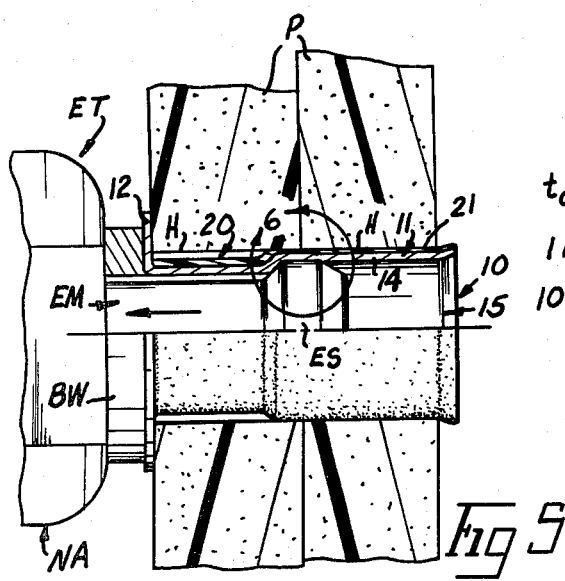
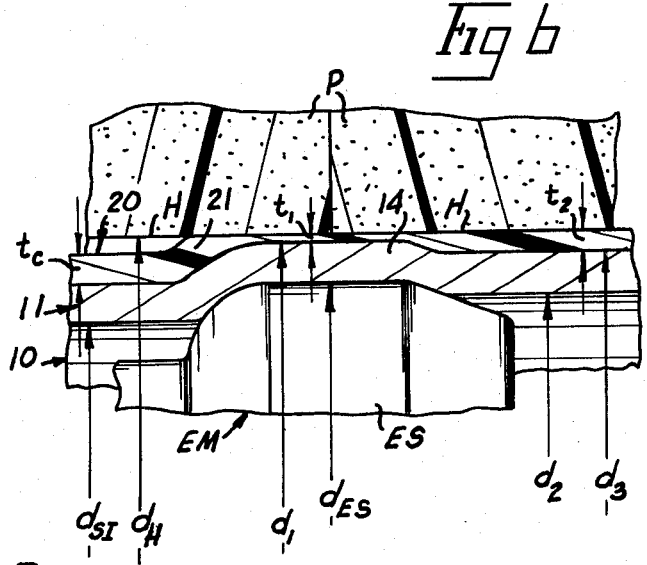

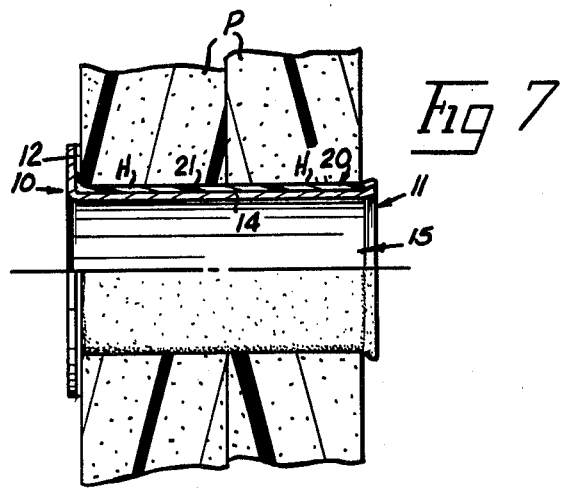
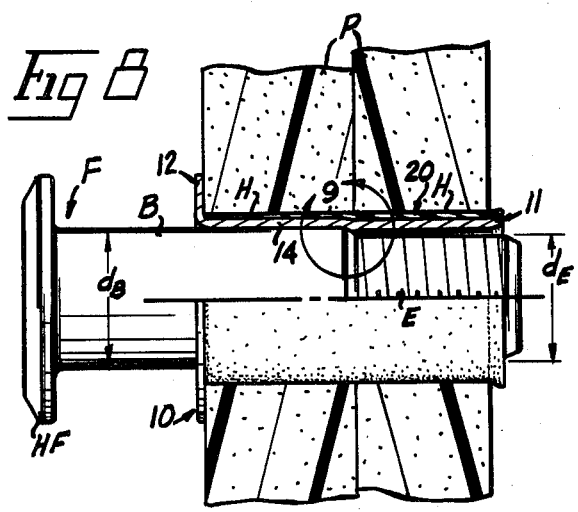
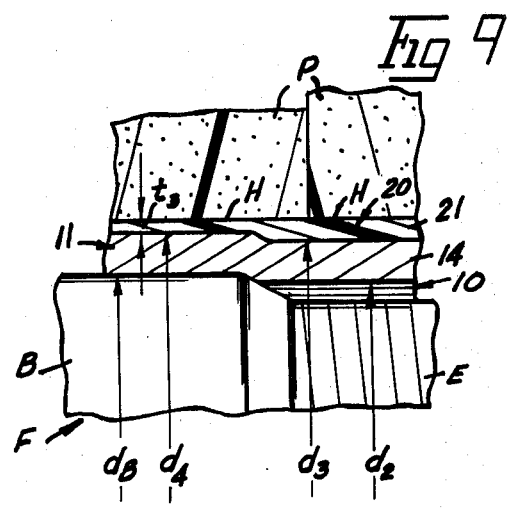
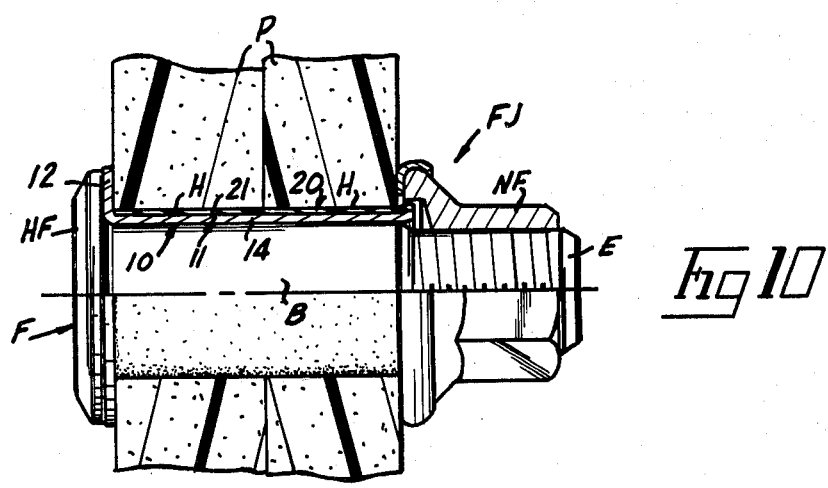

CUSHIONED FASTENER JOINT

BACKGROUND OF THE INVENTION

Because of the enhanced strength and weight savings possible with composite materials as compared with metals, the aerospace industry is seeking to incorporate such composite materials in aerospace structures. These composite materials incorporate high strength, high elasticity modulus fibers embedded in a plastic matrix to form the structure. A number of these materials are available such as graphite-epoxy composites, boron-epoxy composites, kevlar-epoxy composites, hybrid composites and thermoplastic composites. Because the primary load carrying components of these composites are the fibers, these composites are very strong lengthwise and cross-wise (when cross plys and/or diagonal plys of fibers are used), but relatively weak through their thicknesses since the strength in this direction is no more than the strength of the cured plastic resin of the matrix. One of the primary problems encountered in using such composite materials in such aerospace structures is the difficulty in producing satisfactory fastener joints required to join a plurality of pieces of this composite material together and/or composites to metal structural members. Satisfactory fastener joints in these composite materials require that the joint carry the load for which the joint is designed and also have a long fatigue life.

The techniques such as interference fit and coldworking normally used to enhance the load carrying strength and the fatigue life of fastener joints in all metal structures have, by and large, had the reverse effect on fastener joints in composite materials. This is because such techniques require that the holes through the work pieces be deformed to conform to the fastener or to place a compressive stress in the material of the work pieces about the holes while this deformation of the holes in metal work pieces generally does not affect the strength of the work piece, deformation of the holes in work pieces of composite materials usually causes local delamination of the composite material around the hole as well as crazing or crushing of the plastic matrix of the composite material around the hole. When this occurs, the fatigue life of the composite material is reduced rather than enhanced, thereby making the joint subject to early failure. To insure that no deformation of the composite material of the work pieces about the holes occurs, fasteners joining these work pieces have been installed in clearance fits so that no bearing contact occurs between the bearing section on the shank of the fastener and the work pieces. This has made it difficult to produce fastener joints in these composite materials which transmit the desired design load through the joint while at the same time producing the desired fatigue life in the joint.

Another problem associated with the use of the fastener joints in composite materials, especially those composite materials containing graphite, is galvanic corrosion. While the graphite itself, being at the extreme cathodic end of the galvanic series, is highly resistant to galvanic corrosion, almost all metal fasteners used in the fastener joints are corroded relatively fast. This results in early joint failure.

Yet another problem encountered when using fastener joints in composite materials is that the composite material is frequently damaged if the joint needs to be disassembled and then reassembled for repair. This is also because the composite material is relatively weak through its thickness, and loading of the material axially of the fastener holes tends to deteriorate or destroy the plastic matrix.

SUMMARY OF THE INVENTION

These and other problems associated with prior art fastener joint fabrication techniques in composite materials are overcome by the invention disclosed herein by producing a fastener joint in the composite material in which the design load is transmitted through the joint while the required fatigue life is achieved. The technique of the invention achieves these requirements in the composite material joint without requiring excessively expensive manufacturing and fabrication tolerances. The joint of the invention provides a load transmitting layer of material between the fastener and the composite material so that the load transmitting layer is in contact with the hole surfaces. This load transmitting layer is significantly softer than the composite material of the work pieces so that the load transmitting layer is deformed into intimate contact with the hole surfaces without deformation of the work pieces about the holes, yet has sufficient strength to transmit the operating load from the work pieces to the bearing section on the shank of the fastener while maintaining the bearing section on the shank of the fastener physically separated from the hole surfaces. Even though the load transmitting layer is significantly softer than the composite material, its thickness is maintained below the threshold flow thickness of the material of the layer so that significant thinout of the load transmitting layer due to material flow within the layer lengthwise of the holes is prevented. A metal sleeve member may be used to install the load transmitting layer in the holes by radially and circumferentially expanding the sleeve member within the holes while the load transmitting layer is carried on the outside of the sleeve member. This forces the load transmitting layer into contact with the hole surfaces and causes the load transmitting layer to be deformed to intimately conform the hole surfaces. At the same time, the load transmitting layer may be forced to a thickness below the threshold thickness of the material of the load transmitting layer. Preferably, the sleeve member is left in the holes although the sleeve member may be removed after the load transmitting layer is installed. After the load transmitting layer is installed, a fastener is installed in interference fit through the sleeve member if it is left in the holes or through the load transmitting layer if the sleeve member is removed. This insures bearing contact with the bearing section on the shank of the fastener so that the operating load on the joint is transmitted to the bearing area on the fastener through the load transmitting layer, yet the bearing area on the shank of the fastener is separated from the hole surfaces so that deformation of the work pieces about the holes is prevented. Where the load transmitting layer is galvanically inert, it galvanically isolates the composite material from the fastener to significantly inhibit the galvanic corrosion of the fastener. Further, the fastener of the joint can be removed and reinstalled without damage to the composite material.

The joint of the invention uses a sleeve member to line the holes through the composite material with a cushion layer between the sleeve member and the composite material. The sleeve member and the cushion layer thereon have an initial diameter smaller than the holes in the work pieces so that they can be inserted into the holes in clearance. After the sleeve member is in place in the holes, an expansion mandrel is passed axially through the sleeve member to radially and circumferentially expand the sleeve member non-elastically sufficiently to force the cushion layer into contact with the hole surface and then compress the cushion layer to a load transmitting thickness without the sleeve member contacting the hole surface. As the cushion is compressed between the sleeve member and hole surface, the cushion conforms to the hole surface. A conventional fastener is then placed in interference fit through the sleeve member to complete the joint.

These and other features and advantages of the invention disclosed herein will become more apparent upon consideration of the following detailed description and accompanying drawings wherein like characters of reference designate corresponding parts throughout the several views and in which:

BRIEF DESCRIPTION OF THE DRAWINGS

FIG. 1 is an elevational view shown partly in cross-section of the coated sleeve member of the invention;

FIG. 2 is an end elevational view of the coated sleeve member of FIG. 1;

FIG. 3 is a longitudinal cross-sectional view of the coated sleeve member of FIG. 1 in position in the work pieces prior to expansion;

FIG. 4 is an enlarged cross-sectional view taken as shown by line 4 in FIG. 3;

FIG. 5 is a view similar to FIG. 3 showing the coated sleeve member being initially expanded;

FIG. 6 is an enlarged cross-sectional view taken as shown by line 6 in FIG. 5;

FIG. 7 is a view similar to FIG. 5 showing the coated sleeve member after initial expansion;

FIG. 8 is a view similar to FIG. 7 showing the coated sleeve member being finally expanded as a fastener is installed;

FIG. 9 is an enlarged cross-sectional view taken as shown by line 9 in FIG. 8; and FIG. 10 is a view similar to FIG. 8 after the joint is completed.

Figure 11:
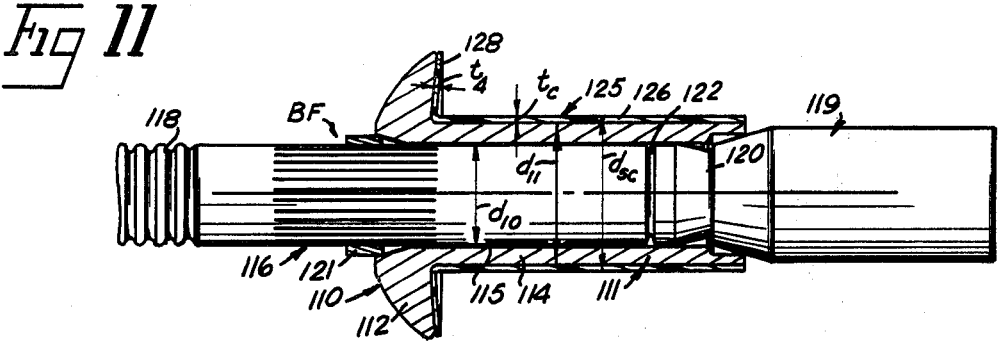

These figures and the following detailed description disclose specific embodiments of the invention; however, the inventive concept is not limited thereto since it may be embodied in other forms.

DETAILED DESCRIPTION OF ILLUSTRATIVE EMBODIMENTS

The invention of this application is directed to the formation of fastener joints in composite material work pieces. These work pieces have high strength, high modulus fibers embedded in a plastic matrix. When holes are drilled through these work pieces, the ends of the fibers are exposed in the hole. Contact between the hole surface and a substantially incompressible material such as a metal fastener results in damaging the work piece around the hole. This invention prevents damage to the work piece at the hole while at the same time permitting loading contact between the fastener assembly and the hole surface.

Referring to FIGS. 1 and 2 of the drawings, it will be seen that the invention makes use of a metal sleeve member 10 which has a cylindrical tubular section 11 with an annular head flange 12 integral with one end of the tubular section 11. The sleeve member 10 has the construction disclosed in my earlier U.S. Pat. Nos. 3,835,615 and 3,835,688 where the side wall 14 of the tubular section 11 generally has a nominally constant thickness $t_S$ along the length of the tubular section 11 which is below the threshold flow thickness of the material of the sleeve member 10. The threshold flow thickness depends on the material of the sleeve member and is that thickness above which significant unrecoverable thinout (about 0.001 inch) of the side wall occurs under the operating load imposed thereon due to the material of the side wall flowing lengthwise of the side wall. This threshold flow thickness is normally about 0.016 inch (0.4 mm) for the metals typically used for the sleeve member 10 and a thickness frequently used is about 0.008 inch (0.2 mm). The tubular section 10 has an initial diameter $d_{SO}$ and defines a passage 15 therethrough with initial diameter $d_{SI}$ as will become more apparent.

The outside surface of the tubular section 11 of the sleeve member 10 is covered with a tubular cushion 20 forming a cushion layer 21 along the length of side wall 14. The cushion layer is made of a material which is compressible and should have a strength in its compressed state sufficient to transmit the joint load from the work piece to the sleeve member as will become more apparent. The cushion layer 21 has an initial nominal thickness $t_C$ along its length to produce an initial outside diameter $d_{SC}$ on cushion 20 as seen in FIGS. 1 and 2. The initial thickness $t_C$ is selected so that, when the cushion layer 21 has been compressed to a thickness sufficient to transmit the operating load from the work pieces to the sleeve member 10, the cushion layer 21 does not significantly flow axially along the sleeve member. This thickness, of course, depends on the particular material selected for the cushion 20. While a variety of materials may be used for cushion 20, plastic materials such as vinyl or polyurethane varnish or epoxy compounds have been found satisfactory. These materials have been found to be able to transmit the operating load from the work pieces to the sleeve member 10 when the cushion layer 21 has been compressed from an uncompressed thickness $t_C$ of about 0.005 inch (0.13 mm) to a compressed thickness of about 0.002 inch (0.05 mm) or less and do not significantly flow axially of the sleeve member 10 under the operating load of the joint at this compressed thickness.

If a plastic material which can be shrunk such as by heat is used for the cushion 20, the material may be initially formed as a tube with an inside diameter slightly larger than the outside diameter of the tubular section 11. After the thusly formed tube is placed over the outside of the tubular section 11 of sleeve member 10, it is shrunk into contact with the outside of tubular section 11 to install the tube of plastic material on the tubular section 11 so that the resulting cushion 20 is held in place on sleeve member 10.

If the cushion 20 is formed from a material curable from a liquid phase, the outside of the tubular section 11 on sleeve member 10 may be coated with the material to the desired thickness. When the material is allowed to cure, the cushion 20 will thus be formed in place on the outside of the tubular section 11 of sleeve member 10.

The underside of the head flange 12 may be uncoated as seen in FIGS. 3-6 and 8-10 or may be covered by an annular washer-shaped cushion 22 as seen in FIGS. 1 and 7 which engages the surface of the work piece P around the hole H to separate the head flange 12 from the work piece. Preferably, the cushion 22 is made of the same compressible material as the cushion 20. The cushion 22 has a nominal thickness $t_H$ such that the cushion 22 does not significantly flow under the tension load applied to the cushion 22 during the formation of the joint as will become more apparent. A thickness $t_H$ of about 0.002 inch (0.05 mm) or less has been found satisfactory for this purpose. Where the cushion 22 is made of the same material as the cushion 20, it may be made integral with the end of cushion 20 and is so shown in the drawings.

The sleeve member 10 with the cushions 20 and 22 thereon is for use in a fastener joint FJ shown completed in FIG. 10. Such a joint has work pieces P, at least some of which are made of the composite material. The cushion 20, being compressible, conforms to the hole surfaces so as to permit the work pieces P to be in bearing contact with the fastener F as seen in FIG. 10 while at the same time maintaining separation between the surface of the holes H through the work pieces P and the metal sleeve member 10 to prevent damage to the hole surfaces. The sleeve member 10 permits the cushion 20 to be placed in the holes H and forced into position without damage to the cushion 20. When the cushion 22 is provided under the head flange 12, it serves to separate the head flange 12 from the surface of the work pieces around the end of the holes H to prevent damage to the work piece as the fastener is tightened.

The joint FJ seen in FIG. 10 is made by first forming aligned holes H through the work pieces P as seen in FIG. 3 which have a diameter $d_H$ larger than the initial outside diameter $d_{SC}$ of the cushion 20 on the sleeve member 10 so that the cylindrical tubular section 11 with the cushion 20 thereon passes freely through the holes H in clearance therewith as seen in FIG. 4 until the cushion 22 under the head flange 12 engages the near side NS of work pieces P as seen in FIG. 3. Thus, the cushion layer 21 is not damaged while the sleeve member 10 is being inserted in the holes.

As seen in FIG. 5, an expansion tool ET is used to radially and circumferentially expand the tubular section 11 while section 11 is held axially fixed with respect to holes H. Since the cushion 20 is mounted on the tubular section 11 of sleeve member 10, it remains axially fixed with respect to the holes H and is radially and circumferentially expanded along with the tubular section 11.

While different expansion tools may be used, the tool ET illustrated uses a conventional lockbolt installation gun, the nose assembly NA of which is seen in FIG. 5, along with an expansion mandrel EM. The nose assembly NA holds the sleeve member 10 axially fixed with respect to the holes H and pulls the expansion mandrel EM through the passage 15 in the sleeve member 10 to expand it. An expandable backup washer BW may be placed between the nose assembly NA and the head flange 12 on sleeve member 10 as seen in FIG. 5 to prevent the formation of a lip on the sleeve member 10 when the mandrel EM exits the sleeve member 10. This tool is illustrated in more detail in my U.S. Pat. Nos. 3,805,578 and 3,835,688.

The mandrel EM has an expansion section ES thereon with a major diameter $d_{ES}$ larger than the initial inside diameter $d_{SI}$ of the sleeve member 10. The diameter $d_{ES}$ is selected to cause the tubular section 11 of sleeve member 10 to be non-elastically expanded (i.e. coldworked) as the expansion section ES is forced through the tubular section 11. Each portion of the tubular section 11 is expanded out to the outside diameter $d_1$ seen in FIG. 6 by the expansion section ES on mandrel EM. This causes the cushion 20 to be expanded into contact with the work pieces P at the surface of holes H and cushion layer 21 to be compressed to a thickness $t_1$. The reactive compressive force exerted on the tubular section 11 through the cushion layer 21 after the tubular section 11 has been expanded out to diameter $d_1$ causes the tubular section 11 to rebound or recover after the expansion section ES has passed to a recovered inside diameter $d_2$ and a recovered outside diameter $d_3$ seen in FIG. 6. The diameters $d_2$ and $d_3$ are respectively larger than initial diameters $d_{SI}$ and $d_{SO}$ but respectively less than expanded diameters $d_{ES}$ and $d_1$. When the tubular section 11 recovers, the cushion layer 21 is allowed to expand to a recovered thickness $t_2$ (FIG. 6) less than thickness $t_C$ but greater than thickness $t_1$. The sleeve member 10 after passage of mandrel EM therethrough is illustrated in FIG. 7. It will be appreciated that the outside of the tubular section 11 on sleeve member 10 never comes into contact with the surfaces of holes H during this operation.

A conventional fastener F is then inserted through the expanded passage 15 in sleeve member 10 as seen in FIG. 8. Fastener F has a cylindrical bearing section B with an enlarged head HF at one end and an engagement section E at the other. The bearing section B has a diameter $d_B$ larger than the recovered inside diameter $d_2$ of tubular section 11 so that the bearing section B will be in interference fit with sleeve member 10 while engagement section E has a major diameter $d_E$ less than the recovered inside diameter $d_2$ of tubular section 11 as seen in FIG. 9. Typically, the diameter $d_B$ is 0.001–0.003 inch larger than the recovered inside diameter $d_2$ of the tubular section 11. Thus, when the bearing section B is inserted in sleeve member 10, the inside of the tubular section 11 is reexpanded out to the diameter $d_B$ while the outside is reexpanded to an interference outside diameter $d_4$. This recompresses the cushion layer 21 to an interference thickness $t_3$ seen in FIG. 9. It will be appreciated that the bearing section B of the fastener F is inserted into the sleeve member 10 from that end of the sleeve member 10 at the head flange 12 so that the head flange 12 bearing against the work pieces P directly or through the cushion 22 holds the sleeve member 10 and thus the cushion 20 axially fixed in the holes H as the bearing section B on fastener F is installed. When the bearing section B is in place with head HF seated against head flange 12 on sleeve member 10, a nut HF is installed on the engagement section E to lock the fastener F in place and complete the joint FJ as seen in FIG. 10. As the nut NF is tightened, the force of the fastener head HF toward the work pieces P compresses the cushion 22, if used, so that the tension load in the joint is applied to the work pieces. The cushion 22, however, does not significantly flow and thus maintains separation between the head flange 12 on sleeve member 10 and the work pieces P. It is to be understood that different head style fasteners may be used. Also, lockbolt type fasteners with swagable collars may be similarly used.

There is a definite relationship between the various diameters used in the fastener joint. Usually, it is desirable to use a standard size fastener F and thus the bearing diameter $d_B$ of the fastener F sets the other diameter ranges. Once the diameter $d_B$ is selected, the initial hole diameter range can be calculated since the initial thickness $t_S$ of the sleeve side wall 14 and the initial thickness $t_C$ of the cushion layer 21 are also known. Usually, the side wall thickness $t_S$ of the sleeve member 10 is not significantly changed in the formation of the fastener joint FJ but the thickness $t_C$ of the cushion layer 21 will be significantly reduced as the cushion layer 21 is compressed to the compressed thickness $t_3$ as seen in FIG. 9. Thus, the hole diameter $d_H$ is calculated by adding twice the sleeve wall thickness $t_S$ and twice the compressed coating layer thickness $t_3$ to the bearing diameter $d_B$ of the fastener. For instance, if a fastener is used which has a bearing diameter $d_B$ about 0.245 inch (6.325 mm), a sleeve wall thickness $t_S$ of 0.0085 inch (0.216 mm) and a compressed cushioned layer thickness $t_3$ of 0.002 inch (0.051 mm), it will be seen that the hole diameter $d_H$ should be 0.270 inch (6.858 mm). Using an initial cushion layer thickness $t_C$ of 0.005 inch (0.127 mm), it will be seen that the outside diameter $d_{SC}$ of the sleeve member 10 with the cushion 20 thereon should be less than the hole diameter $d_H$ so that the sleeve member 10 can be inserted into the holes with the cushion 20 in clearance therewith to prevent damage to the cushion layer 21. The sleeve member 10 where the tubular section 11 has an outside diameter $d_{SO}$ of 0.252 inch (6.401 mm) will satisfy these requirements since the outside diameter $d_{SC}$ of the cushion 20 would be 0.262 inch (6.655 mm) thus giving a total diametric clearance of 0.008 inch (0.203 mm). The diameter $d_{ES}$ of the expansion mandrel EM is then selected to expand the tubular section 11 of the sleeve member 10 so that its recovered inside diameter $d_2$ will be less than the bearing diameter $d_B$ of the fastener F by that amount which is to be in interference. For instance, where a diametrical interference of 0.002 inch (0.051 mm) is desired, the recovered inside diameter $d_2$ of the tubular section 11 should be 0.247 inch (6.274 mm). Emperical data is available to predict what the recovered inside diameter $d_2$ will be, and for this particular illustration, an expansion diameter $d_{ES}$ on the expansion mandrel EM of 0.251 inch (6.375 mm) will produce a recovered inside diameter $d_2$ of 0.247 inch (6.274 mm). As the expansion section ES on the expansion mandrel is forced through the tubular section 11, it will be seen that the side wall 14 of the tubular section 11 will be expanded out to an expanded outside diameter $d_1$ of 0.268 inch (6.807 mm) so that the compressed thickness $t_1$ of the cushion layer 21 will be 0.001 inch (0.025 mm). After the mandrel EM has passed through the tubular section 11 and the tubular section 11 has recovered, the recovered thickness $t_2$ of the cushion layer 21 will be 0.003 inch (0.076 mm). When the bearing section B of the fastener F is forced into the tubular section 11 of the sleeve member 10, the inside diameter of the tubular section 11 will be reexpanded back out to the bearing diameter $d_B$ of the fastener F which will recompress the cushion layer 21 back to the interference thickness $t_3$ of 0.002 inch (0.051 mm) in the finished fastener joint FJ. These dimensions are appropriately varied as the fastener bearing diameter $d_B$ is varied.

In the completed fastener joint, then, it will be seen that the cushion layer 21 physically separates the tubular section 11 from the surfaces of holes H, yet transmits the operating load on the work pieces P to the fastener F through the side wall 14 on the sleeve member 10. It will further be noted that the tubular section 11 on sleeve member 10 has not come into contact with the hole surfaces as the joint is being formed to prevent damage to the work pieces about the holes. Also, when the cushion 22 is used, it physically separates the head flange 12 from the near side NS of work pieces P, yet allows the desired initial tension to be applied to the fastener joint as the fastener F is locked in place.

FIGS. 11-14 illustrate a second embodiment of the invention using a hole filling pulltype blind fastener BF. While the invention may be incorporated on a wide variety of such blind fasteners, it is illustrated as applied to a blind fastener of the type shown in U.S. Pat. No. 2,931,532.

The blind fastener BF includes a deformable sleeve 110 with an elongate tubular body 111 and a head 112 integral with one end thereof. The tubular body 111 has a side wall 114 with an initial inside diameter $d_{11}$. The body 111 and head 112 define a stem receiving passage 115 therethrough.

An elongate pull stem 116 is slidably received in the stem passage 115 and serves to radially and circumferentially expand the side wall 114 of the tubular body 111 as it is pulled into position. The pull stem 116 has a gripping section 118 on one end thereof adapted to be engaged by a conventional rivet installation tool and an expansion section 119 on the opposite end thereof for expanding the tubular body 111. A collar locking groove 120 is formed in stem 116 adjacent the expansion section 119 to be engaged by a locking collar 121 to hold the expansion section 119 in place after expansion of body 111. A breakneck groove 122 is also provided between the locking groove 120 and the gripping section 118 so that the pulling stem 116 can be fractured at breakneck groove 122 after installation is complete to separate the gripping section 118 from the expansion section 119.

The outside surface of side wall 114 is covered with a tubular cushion 125 forming a cushion layer 126 along the length of the side wall 114. Like cushion 20, the cushion 125 is made out of a material which is compressible and with a strength in its comprssed state sufficient to transmit the joint load from the work piece to the sleeve 110. The cushion layer 126 has an initial nominal thickness $t_c$ along its length to produce an initial outside diameter $d_{sc}$ for cushion layer 126. The initial thickness $t_c$ is selected so that, when the cushion layer 126 has been compressed to a thickness sufficient to transmit the operating load from the work pieces to the sleeve 110, the cushion layer 126 does not significantly flow axially along the sleeve 110. Using materials similar to those disclosed for the cushion 20, a thickness $t_c$ of about 0.005 inch (0.13 mm) compressed to a thickness of about 0.002 inch (0.05 mm) will transmit the load from the work pieces to the sleeve 110 without the layer 126 significantly flowing axially along the sleeve 110.

The underside of the head 112 is covered by a cushion 128 to engage the work pieces around the hole and separate the head 112 from the work pieces. Preferably, the cushion 128 is made out of the same compressible material as the cushion 125. The cushion 128 has a nominal thickness $t_H$ such that cushion 128 does not significantly flow under the tension load applied to the joint as the blind fastener BF is being installed as will become more apparent. A thickness $t_H$ of about 0.002 inch (0.05 mm) or less has been found satisfactory.

Initially, as seen in FIG. 11, the pull stem 116 is positioned in the sleeve 110 so that the expansion section 119 is located at that end of the tubular body 111 opposite the head 112 with the gripping section 118 projecting from the head 112. The locking collar 121 is positioned around the pulling stem 116 adjacent the head 112.

Figure 12:
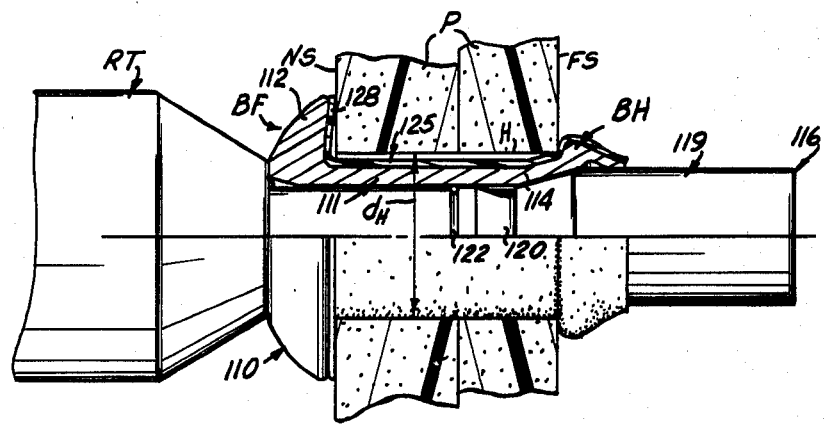

The joint using blind fastener BF is made by first forming aligned holes H through the work pieces P where the holes H have a diameter $d_H$ as seen in FIG. 12 larger than the initial outside diameter $d_{sc}$ of the cushion layer 126 on the sleeve 110. When the fastener BF is positioned in holes H, the cushion 125 around the body 111 on sleeve 110 passes freely through holes H in clearance therewith until the cushion 128 under the head 112 engages the near side NS of work pieces P. Thus, cushion 125 is not damaged as the sleeve 110 is inserted into the holes.

With the rivet installation tool RT gripping the gripping section of the pull stem 116 as seen in FIG. 12, the installation of the blind fastener BF can be carried out. Upon activation of the installation tool RT, pull stem 116 is pulled toward the tool RT while the head 112 is held by the tool. The expansion section 116 enters that end of the tubular side wall 114 opposite head 112 and expands it to a diameter larger than that of holes H to form a blind head BH seen in FIG. 12 on that side of the work pieces P opposite the head 112 on sleeve 110. This serves to force the head 112 toward the near side NS of the work pieces P and compress the cushion 128 so that the work pieces P are clamped between the head 112 and the blind head BH. Because the cushion layer 126 extends along the length of the side wall 114 of body 111, the cushion layer 126 will lie between the blind head BH and the far side FS of the work pieces P to separate the blind head BH from the work pieces. As the blind head BH is formed, the cushion layer 126 between the blind head BH and the work pieces will be compressed to a thickness to transmit the tension load from the blind head to the work pieces without significant flow in the cushion layer 126.

Figure 13:
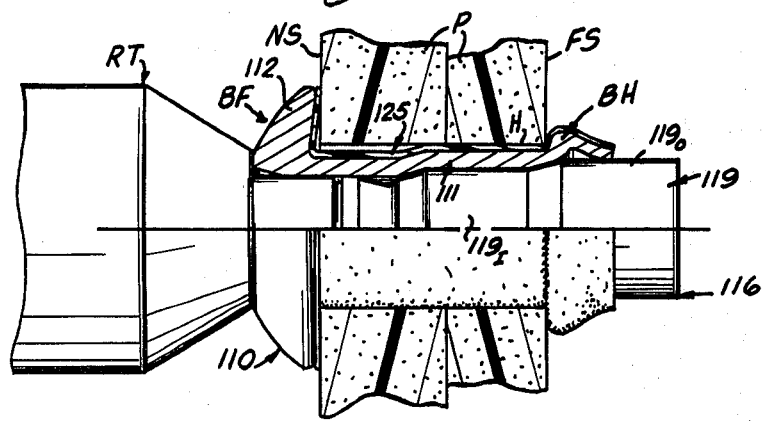

As the installation tool RT continues to pull the pull stem 116, the outside portion $119_O$ of the expansion section 119 extrudes from around the inside portion $119_I$ as seen in FIG. 13 so that the outside portion $119_O$ maintains the blind head BH in place. The inside portion $119_I$ expands the side wall 114 of the body 111 on sleeve 110 radially and circumferentially while it remains substantially fixed axially with respect to the holes H. The reactive force exerted on the expansion section 119 causes the outside diameter of the inside portion $119_I$ to be such that the side wall 114 is expanded sufficiently to compress the cushion layer 126 against the hole surface to a compressed thickness $t_M$ such that the cushion layer 126 will transmit the operating load from the work pieces P to the sleeve 110 as explained above. The cushion layer 126 is not stripped from the side wall 114 as the blind fastener is installed since the outside surface of side wall 114 remains substantially fixed axially of holes H during this operation.

Figure 14:
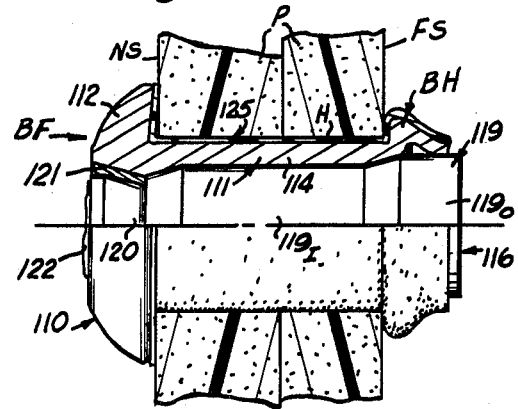

The installation tool RT continues to pull the pull stem 116 until the breakneck groove 122 is flush with the outside surface of head 112 and then inserts the locking collar 121 between the head 112 and the locking groove 120 to lock the pull stem 116 in place in the sleeve 110. The tool RT then fractures the pull stem 116 at the breakneck groove 122 to separate the pull stem and form the finished joint as seen in FIG. 14.

In the completed blind fastener joint, it will be seen that cushion layer 126 physically separates the side wall 114 and blind head BH from the work pieces while the cushion 128 separates the head 112 from the work pieces. It will further be noted that the sleeve 110 has not come into contact with the work pieces as the joint is being formed to prevent damage to the work pieces.

The cushion layer 126 has been compressed to a thickness such that the operating load on the joint is transmitted from the work pieces to the sleeve 110 to maintain the strength of the joint.

What is claimed as invention is:

1. A method of forming a fastener joint in a composite material work piece subjected to an operating load comprising the steps of:
   (a) forming a hole of a prescribed hole diameter through the composite material work piece;
   (b) placing a tubular metal sleeve member with a compressible cushion layer around the outside thereof where the cushion layer has an initial outside diameter smaller than the hole diameter within the hole through the work piece;
   (c) radially and circumferentially expanding the tubular metal sleeve member to force the cushion layer into contact with the hole surface and compress the cushion layer; and
   (d) placing a fastener in the tubular metal sleeve member to maintain the sleeve member radially and circumferentially expanded and the cushion layer compressed to a thickness to transmit the operating load from the work piece to the fastener through the cushion layer and sleeve member.

2. The method of claim 1 wherein step (c) further includes passing a mandrel axially through the tubular metal sleeve member while holding the sleeve member axially fixed within the hole to non-elastically expand the sleeve member sufficiently to force the cushion layer into contact with the hole surface and compress the cushion layer but not sufficiently to force the outside of the sleeve member into contact with the hole surface so that, after the mandrel has passed through the sleeve member, the sleeve member maintains the cushion layer in compression.

3. The method of claim 2 wherein step (d) further includes forcing the fastener into the sleeve member while holding the sleeve member axially fixed within the hole to expand the sleeve member and compress the cushion layer to a final thickness to transmit the operating load on the joint from the work piece to the fastener without the outside of the sleeve member coming into contact with the hole surface where the final thickness to which the cushion layer is compressed is less than the threshold thickness of the cushion layer below which insignificant material flow within the cushion layer takes place under load.

4. The method of claim 3 wherein step (d) includes compressing the cushion layer to a thickness of no greater than 0.002 inch.

5. The method of claim 4 wherein said cushion layer is vinyl.

6. The method of claim 4 wherein said cushion layer is polyurethane varnish.

7. A joint construction including:
   composite material workpieces each defining a hole therethrough of a first prescribed diameter;
   a fastener through said holes having a bearing section within said holes of a second prescribed diameter smaller than said first prescribed diameter;
   a metal sleeve member within said holes around said bearing section of said fastener and including a radially expanded continuous tubular side wall in bearing contact with said bearing section of said fastener, said tubular side wall having a third prescribed outside diameter smaller than said first prescribed diameter and having a prescribed side wall thickness less than the threshold thickness of the material of said sleeve member below which insignificant material flow within said side wall occurs under load; and a compressible cushion within said holes between said sleeve member and said workpieces and substantially filling the space between said sleeve member and said workpieces within said holes, said cushion having been placed in said hole while on said metal sleeve member while said cushion was uncompressed and had an initial outside diameter smaller than the hole diameter and subsequently forced into contact with the hole surface and compressed by radially and circumferentially expanding said tubular side wall of said sleeve member, said fastener maintaining said sleeve member radially and circumferentially expanded so that said cushion is compressed to a compressed thickness such that insignificant material flow within said cushion takes place under load and so that said cushion is maintained under sufficient compression between said sleeve member and said workpieces to cause the operating load of the joint to be transferred from said workpieces to said fastener through said cushion and said sleeve member.

8. The joint construction of claim 7 wherein the side wall thickness of said sleeve member is no greater than 0.016 inch and wherein the compressed thickness of said cushion is no more than 0.002 inch.

9. The joint construction of claim 7 wherein said cushion is vinyl.

* * * * *